April 18, 1961  D. B. KECECIOGLU ET AL  2,980,345
ULTRASONIC APPARATUS AND METHODS OF COMMINUTION
Filed Feb. 10, 1958  4 Sheets-Sheet 1

Inventors
Dimitri B. Kececioglu
Robert T. Baugh
Thomas R. Hoffmann
by Richard R. Mybeck
Attorney April 18, 1961 D. B. KECECIOGLU ET AL 2,980,345
ULTRASONIC APPARATUS AND METHODS OF COMMINUTION
Filed Feb. 10, 1958 4 Sheets-Sheet 2

Inventors
Dimitri B. Kececioglu
Robert T. Baugh
Thomas R. Hoffmann
by Richard R. Mybeck
Attorney April 18, 1961   D. B. KECECIOGLU ET AL   2,980,345
ULTRASONIC APPARATUS AND METHODS OF COMMINUTION
Filed Feb. 10, 1958   4 Sheets-Sheet 3
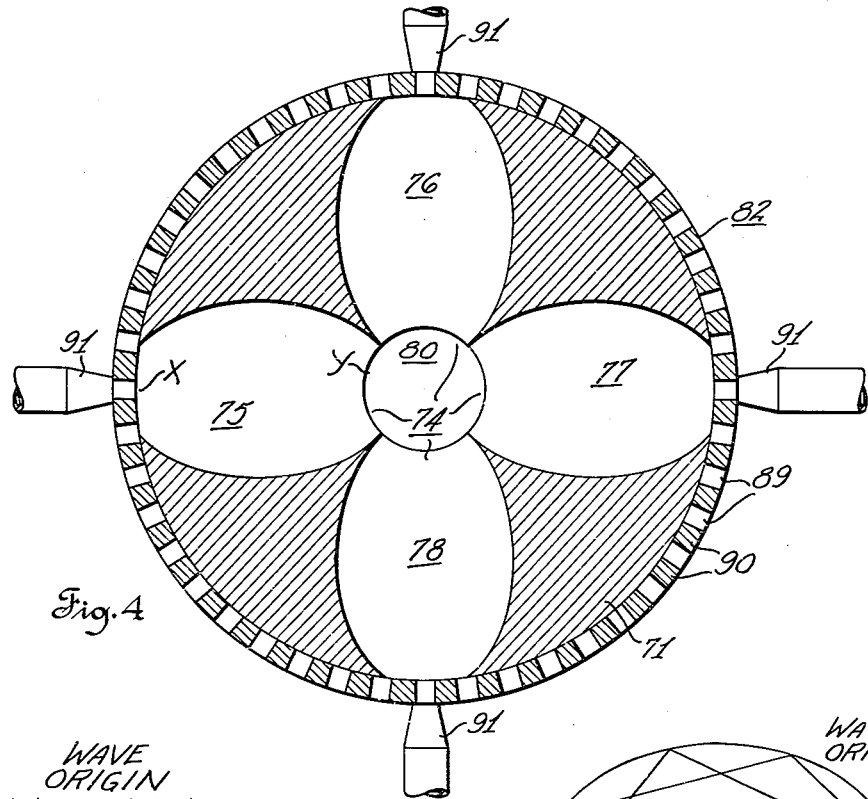
Fig. 4
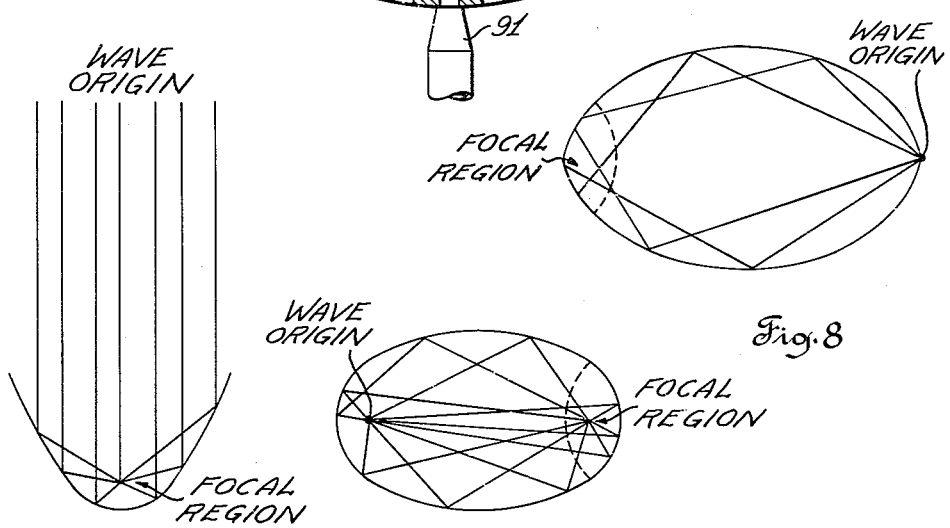
WAVE ORIGIN
FOCAL REGION
Fig. 6
WAVE ORIGIN
FOCAL REGION
Fig. 7
WAVE ORIGIN
FOCAL REGION
Fig. 8
Inventors
Dimitri B. Kececioglu
Robert J. Baugh
Thomas R. Hoffmann
by Richard R. Mybeck
Attorney United States Patent Office 2,980,345
Patented Apr. 18, 1961

2,980,345

ULTRASONIC APPARATUS AND METHODS OF COMMINUTION

Dimitri B. Kececioglu and Robert T. Baugh, Milwaukee, and Thomas R. Hoffmann, Madison, Wis., assignors to Allis-Chalmers Manufacturing Company, Milwaukee, Wis.

Filed Feb. 10, 1958, Ser. No. 714,200

18 Claims. (Cl. 241—1)

The invention relates generally to the art of material comminution and more particularly to ultrasonic apparatus and methods for obtaining size reduction of solid particles.

For many years there has been an unfulfilled need for comminution apparatus which would obviate the disadvantages inherent in the more conventional devices in use today, such as gyratory, cone, jaw crushers and the like, which effect comminution by utilizing bearing surfaces of the structure itself in contact with the material to be comminuted to apply compressive and shear forces upon the material. In operation, these bearing surfaces are subject to great wear and, by attrition, abrasion, etc., rapidly deteriorate. Frequently, the members and elements providing these surfaces completely fail through rupture and the like and must therefore be replaced at no small cost. The replacement of such members and elements also causes the entire device to be shut down which results in costly loss of production time.

Generally, the present invention contemplates apparatus and methods for comminuting solid particles by the generation and controlled direction of ultrasonic waves. Although various ultrasonic devices have heretofore been proposed to reduce the size of solid particles, the present invention utilizes principles not heretofore applied by any of these devices.

Of course the present invention has certain broad features which were utilized in some of the known prior devices such as the utilization of a rotating slotted impeller continuously breaking radially disposed continuously flowing jet streams to generate waves of ultrasonic frequency. However these devices utilized ultrasonic waves to actuate additional elements, such as reeds, balls, chamber diaphragms and the like, which in turn acted upon the solid matter. These devices possessed the common disadvantages in that they lost considerable energy in the successive energy transfers required for operation and that the additional elements were rapidly consumed.

On the other hand, quite unlike the known prior art devices, the present invention provides a comminution by the controlled direction and concentration of ultrasonic waves into direct engagement with particles of solid matter passing through a central comminution region. In addition the present invention provides means whereby the origin of the ultrasonic waves corresponds or simulates one focus of a sonically reflective compartment in which the inner surface of the compartment reflects the waves into a second or finite focus to define the comminution region of the apparatus. Still further, the present invention allows a direct energy transfer from the ultrasonic waves to the material particles and obviates the requirement for consumable additional elements acting on the material. Other novel features will readily appear from the following description of the embodiments and modifications herein chosen to exemplify the present invention.

Accordingly, one of the prime objects of the present invention is the provision of apparatus and methods for comminuting solid materials utilizing the effect of concentrated ultrasonic waves upon individual material particles to fracture the particles.

Another prime object of the present invention is the provision of comminution apparatus capable of generating and controlling the path of ultrasonic waves of selectable frequencies and of directing both the flow of the ultrasonic waves and the flow of solids into a common focal region.

Another object of the present invention is the provision of comminution apparatus in which the inner surface of a comminution chamber is utilized to concentrate and focus ultrasonic waves into a central region for engaging a flow of feed material passing therethrough.

Still another object of the present invention is the provision of comminution apparatus having a sonically reflective chamber characterized by having two focal regions, at least one of which is disposed at a finite locus within the chamber.

Still another object of the present invention is the provision of comminution apparatus in which ultrasonic waves are generated from a locus corresponding to or simulating one focal region of the comminution chamber and are reflectable by the inner surface thereof into another focal region therein.

An even further object of the present invention is to provide comminution apparatus and methods in which material size reduction is effected by the out-of-phase vibration of various parts of an individual feed particle at its resonance in response to a concentration of ultrasonic waves of selective frequency approximating the natural frequency thereof focusing thereupon.

These and still further objects as may appear are fulfilled by the present invention in a manner readily discerned from the following detailed description when read in conjunction with the accompanying drawing.

In the drawing:

Fig. 4 is a cross sectional view taken along line IV—IV of Fig. 3;

Figs. 6, 7 and 8 are geometric showings of the patterns of sonic reflection employed by three embodiments of the present invention.

Figure 1:
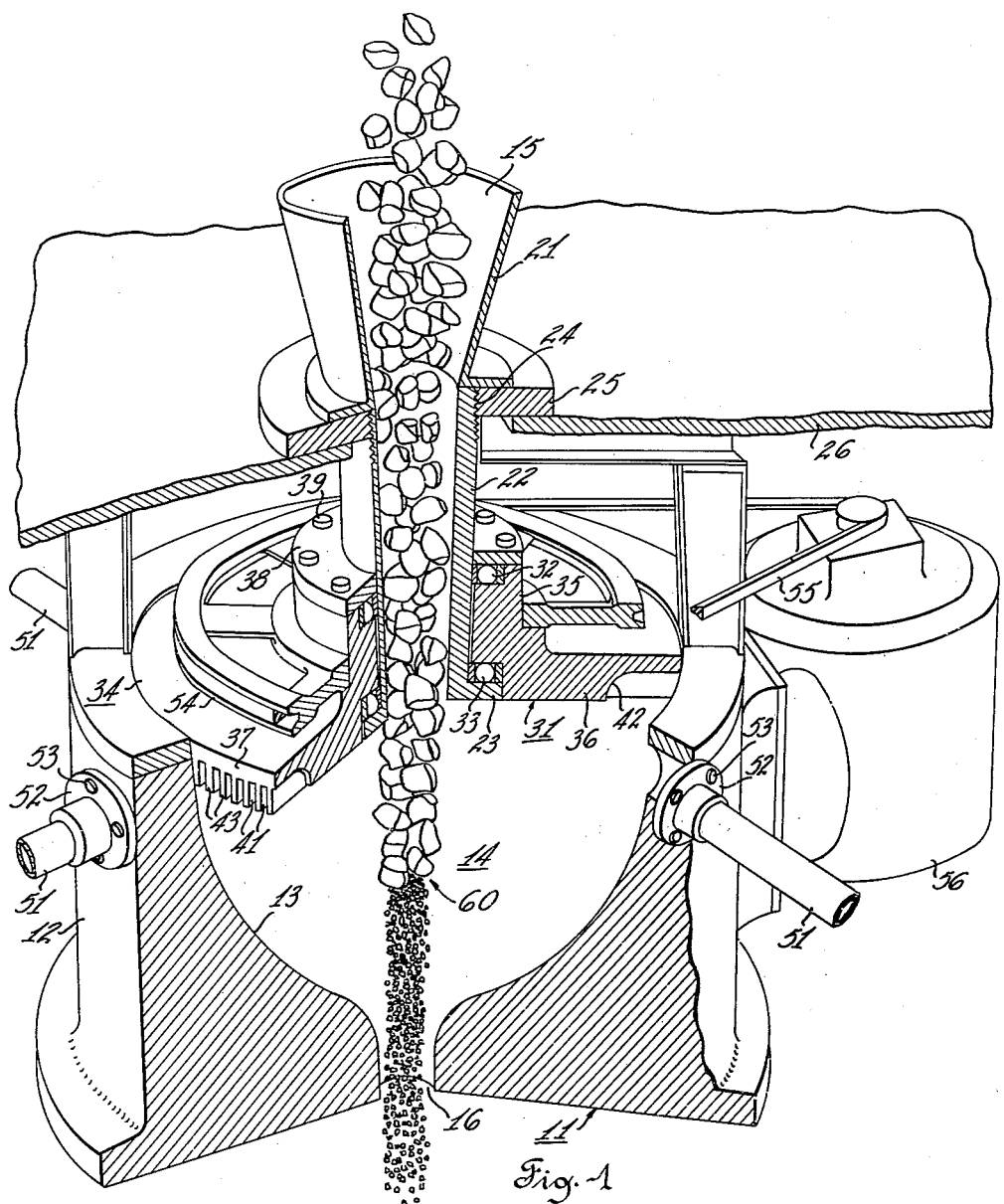
Fig. 1 is an isometric view, partially broken away, of an exemplary embodiment of the present invention.

In the drawing, apparatus exemplifying the present invention is indicated generally at 11 and (see Fig. 1) includes a housing 12 which by the contour of its inner surface 13, the special significance of which will be more thoroughly considered in subsequent paragraphs, defines a comminution chamber 14 having a material inlet 15 and a material outlet 16.

The material inlet 15 comprises a guide portion 21 for channeling feed material through a tubular portion 22 into chamber 14. Tubular portion 22 is provided at its lower end with an outwardly extending annular flange 23 and is threaded at its upper end 24 whereby it engages the threads of a suitable lock ring 25 and is locked in suspended relationship from top plate 26 of the apparatus 11.

Means for generating ultrasonic waves such as ultrasonic generator 31, is rotatably mounted about tubular portion 22 for movement relative thereto and is provided with a pair of suitable bearings 32, 33.

Generator 31 comprises a generally cylindrical impeller 34 having a first portion 35 extending axially with tubular portion 22 for a running fit therewith in engagement with bearings 32, 33 and a second portion 36 extending radially from tubular portion 22 for a dimension sufficient to impart a desired angular velocity to the outer edge 37 thereof. An annular dust cover 38 is placed about tubular portion 22 and is secured to impeller portion 35 in any suitable manner such as bolts 39. Spaced about outer impeller edge 37 are a plurality of slots 41, each having an arcuate back surface 42 (see Fig. 2) for sonically reflecting sound waves into contact with inner surface 13. Intermediate each pair of adjacent slots 41 is a dividing wall or vane 43.

A plurality of air jets 51 are symmetrically spaced in radial disposition about chamber 14 and in substantial alignment with the peripheral opening of the respective slots 41. The air jets 51 are supplied by a suitable compressed air system (not shown). Each of the air jets 51 are positioned stationary relative to housing 12 by a flanged sleeve 52 suitably secured as with bolts 53.

Figure 2:
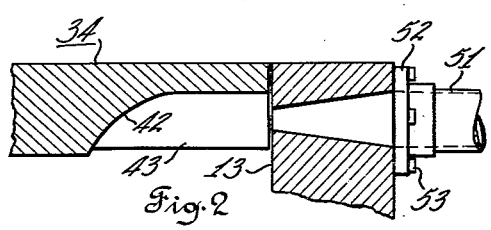
Fig. 2 is a fragmentary section of an impeller slot of the embodiment of Fig. 1.

The contour of arcuate back surface 42, shown enlarged in Fig. 2, is preferably in the shape of a paraboloid of revolution positioned relative to one of the air jets 51 in such a manner that the point of origin of the ultrasonic waves created by the coaction of the jets with the impeller coincides with the finite focal point of the paraboloid. This is because, in the embodiment of Fig. 1, it is desired that the waves be reflected by this surface in paths substantially parallel to the feed flow through the chamber to simulate origin at infinity. Alternatively, the relative position of the paraboloid may be shifted away from the jet to provide substantially the same result when the sound waves originating at the jet are directed through the focal point of the paraboloid.

It has been found that the maximum number of slots and consequently the maximum cycles per impeller revolution are attained by equispacing slots 41 about impeller edge 37. It has also been found that, when desired, the pattern of wave impingement shown in Fig. 6 can most readily be obtained by either randomly or sequentially varying the focal lengths of the surfaces 42 of the respective slots 41 from their respective air jets 51 which is most readily effected by altering the depth of radial penetration of slots 41 into impeller 34. The effect of dispersing the points of wave impingement may also be realized by altering the shape of the orifices of the various air jets as well as by varying the arcuate contours of surfaces 42.

When the nature of the particles being comminuted make it desirable that they be attacked by the waves at various angles as shown in Fig. 6, this action is most satisfactorily obtained in the first manner described above.

Operatively associated with impeller 34 are suitable driving means for rotating the impeller at a preselected speed. For example, in Fig. 1, a slotted pulley 54 is mounted integrally with and in circumscribing relationship to impeller first portion 35 and is suitably connected, as by a belt 55, to a variable speed drive motor 56. Equally suitable would be a turbine drive (not shown) mounted coaxially with impeller portion 35 and actuated by the same or different air system as is used with jets 51.

To operate the embodiment shown in Fig. 1, an operator will, either simultaneously or sequentially, energize drive motor 56, initiate the flow of air through the jets 51, and initiate the flow of solid matter through material inlet 15.

The rotation of motor 56 actuates belt 55 which rotates pulley 54 and impeller 34 and by varying the speed of the motor 56 by any of the means well known in the art, the velocity of the impeller and therefore the relative movement between the slots 41 and the air jets can be controlled to achieve the desired ultrasonic frequency. Since frequency is equal to the impeller speed times the number of openings in the impeller, the frequency of the ultrasonic waves generated is, therefore, a direct function of motor speed and can be readily varied in accordance with the particular requirements of the feed material.

The ultrasonic waves thus produced pass through the slots 41 until they strike back surface 42 (shown in Fig. 2) whereupon they are reflected downwardly into chamber surface 13 from whence they are again reflected outwardly therefrom, into a focal region 60.

The feed of material into chamber 14 likewise is controlled by tubular portion 22 to drop through focal region 60 where the material is acted upon and fractured by the action of the ultrasonic waves. While the preferred embodiment of this invention contemplates a continuous feeding arrangement, such as the gravity feeding inlet shown, it is understood that these apparatus may be used with equal success upon an intermittent flow of material.

The inner surface 13 of chamber 14 in the embodiment of Fig. 1 is geometrically definable as a paraboloid of revolution having its axis of rotation substantially coincident with the axis of material flow and provides means for focusing the waves into focal region 60. As is well known, a paraboloid of revolution has two focal points or "regions," as they are herein identified to include slight reflective imperfections, one which is at infinity and one which is at a finite location. In the embodiment of Fig. 1, the ultrasonic waves enter chamber 14 in paths generally parallel to the axis of rotation (as a result of the action of surface 42 of slot 41 upon the waves) thereby simulating origin at infinity. The finite focal region of the chamber then becomes the focal of reflection into which all of the waves are concentrated and in which comminution is effected.

For matter to be vibrated in accordance with the present invention, it is necessary only that an adequate source of vibrational energy be established. However, comminution is achieved when the vibrational energy is carried in waves having a frequency approximately, or equal to, the natural frequency of the material being treated. A greatly increased comminution output is realized for a given energy input when all of the vibrational energy is carried by such waves.

To put it another way, a minimum of external energy is required to exceed the tensile strength of a given particle when that energy is supplied with a frequency at or near the natural frequency of the particle of material being treated because vibration of the particle at resonance permits the utilization of the forces resulting from the greatly increased amplitude of vibration, occurring within the particle as it achieves resonance, to break the particle in tension.

Stated still another way, for breakage to occur, the particle has to be pulled apart a given amount, i.e., subjected to a given strain. This strain should be of a magnitude in excess of that required for breakage. As vibration at resonance provides the maximum amplitude of vibration and in turn, maximum strain, the chances are greatest that for a given energy input more particles will be broken because more of them will be vibrated to the required amplitude (strain) for breakage. This would lead to a greater efficiency in comminution at resonance because there will be a greater output or breakage (which is the ultimate objective of this invention) for a given amount of energy generated at the source of ultrasonic waves. At frequencies other than that of resonance for a given energy input, few particles will be vibrated to amplitudes necessary for breakage and the other particles will merely absorb some of the energy by damping, hysteresis and elastic deformation through having been vibrated to amplitudes insufficient for breakage, and the remainder of the energy will be wasted in the system as sonic energy by being dissipated through attenuation (viscous and thermodynamic dissipation) and not being used as comminution energy. Thus, the relationship between wave frequency and the natural frequency of the material being treated is critical to the extent described above.

An important aspect of the present invention is that the contour of the inner surface 13 of the comminution chamber 14 be of such a shape that all of the ultrasonic waves generated into contact therewith will be sonically reflected thereby into the common focal region 60.

Figure 3:
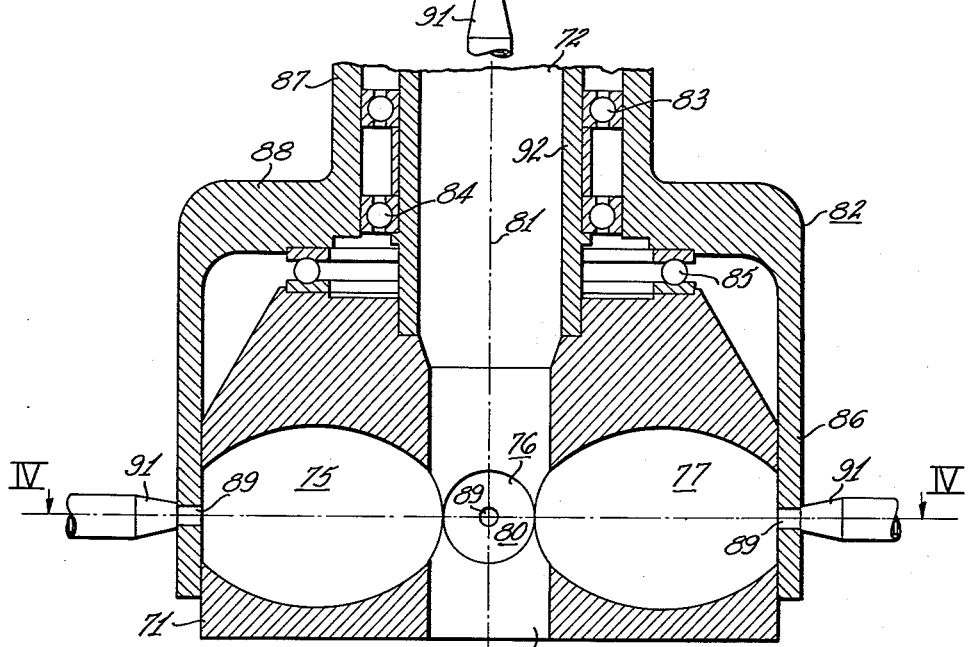
Fig. 3 is a side cross sectional elevation of a modified embodiment of the present invention.

An alternative embodiment of the present invention, which is particularly adaptable to installations in which head room is of paramount importance, is shown schematically in Figs. 3 and 4. The pattern of the wave reflection for this embodiment is represented by Fig. 8. As shown, the apparatus comprises a housing 71 having a feed inlet 72 and a feed outlet 73 and defining a comminution chamber 74 comprising a plurality of reflective compartments 75, 76, 77, 78, each of which are likewise characterized by at least one finite focal region. Each of the compartments, for example, compartment 75, is provided with two openings, one (identified by the suffix "x") is disposed adjacent the outer end thereof and the other (identified by the suffix "y") is disposed adjacent and opens into a centrally disposed focal region 80 at the other end thereof. The compartments 75–78 are disposed symmetrically about and radiate from the axis of material flow 81 (shown in phantom in Fig. 3).

Ultrasonic wave generating means are operatively associated with housing 71 and comprise an impeller 82 mounted for rotation above feed inlet 72 in suitable ring bearings 83, 84 and is mounted for rotation upon housing 71 on a suitable thrust bearing 85. The details of construction of the aforementioned bearings, as well as those mentioned in conjunction with Fig. 1, are within the province of mechanical design and need not be explained with particularity in this specification other than to say that they are sufficiently rugged to withstand the vibratory forces and high rotative speeds imposed on the apparatus, and are adequately sealed against the entrance of dust, etc.

Impeller 82 comprises a first cylindrical portion 86 circumscribing housing 71, a second cylindrical portion 87 circumscribing feed inlet 72 and riding on bearings 83, 84, and an intermediate portion 88 integrally joining the cylindrical portions and riding on thrust bearing 85. A plurality of slots 89 separated by dividing walls 90 define a foraminous belt adjacent the lower end of impeller portion 86 and coact with a plurality of air jets 91 symmetrically disposed adjacent the periphery of impeller 82 in alignment with the belt to generate ultrasonic waves into comminution chamber 74 on a generally horizontal plane.

All of the rotatable impellers herein described are preferably dynamically balanced prior to operation to avoid any difficulty which might arise from rotating an eccentric mass at the high speeds herein anticipated.

Reflective compartments 75–78 are geometrically definable as ellipsoids of revolution characterized by two finite focal regions. As shown, one focal region of each compartment is located adjacent the proximal air jet 91 while the second occurs in centrally disposed focal region 80. Thus, as shown in Fig. 4 each compartment has its receiving focal region within focal region 80 thereby providing this region with a high concentration of ultrasonic waves for effecting material comminution. By arranging the compartments so that their innermost focal points generally coincide, a span of waves is provided to embrace each particle as it passes through focal region 80. In a similar manner, a span is likewise provided by spacing the respective focal points from one another wherein the waves, after they pass through their respective focal points, attack the material to be comminuted.

The matter to be comminuted is introduced through inlet 72 and is guided by tubular member 92 through focal region 80 where it is acted upon by the waves.

Another embodiment of the present invention comprises the same general arrangement of parts and members as shown in Figs. 3 and 4 and further includes an additional modification of the comminution chamber.

Figure 5:
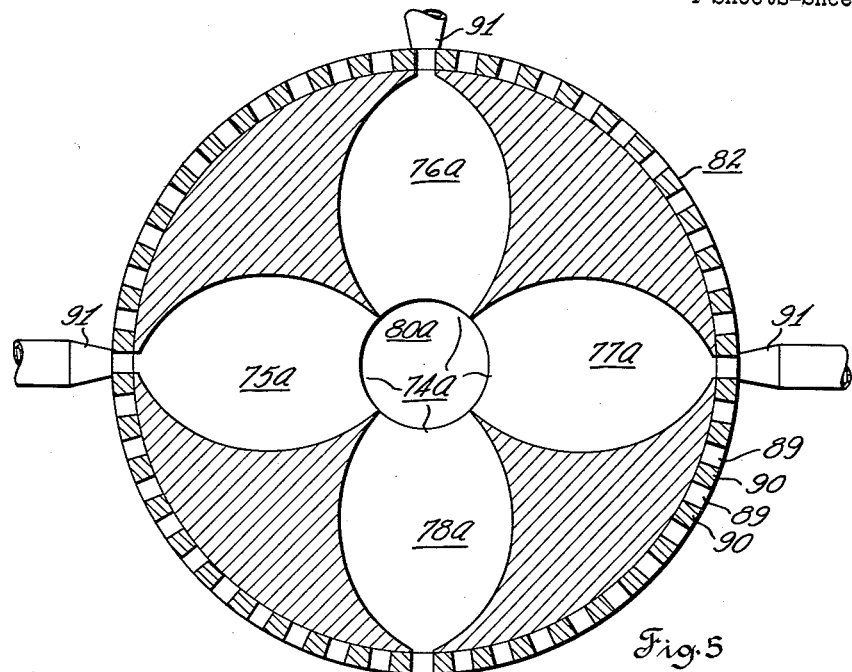
Fig. 5 is a cross sectional view taken along the same plane as Fig. 4 of an additional modified embodiment of the present invention.

Thus, as shown in Fig. 5 (taken along the same general plane as Fig. 4), this embodiment comprises a comminution chamber 74a having a plurality of reflective compartments 75a, 76a, 77a, 78a geometrically definable as cycloids of revolution each having their respective axes of rotation substantially normal to the axis of material flow through the device. As is true with the ellipsoid, the cycloid of revolution is also capable of reflecting generated ultrasonic waves into a common focal region (see Fig. 7) although the effective reflective surface of the cycloid is more limited than that of the ellipsoid. The cycloid further differs from the ellipsoid in that the focal regions it possesses, and which fulfill the requirements of the present invention within its effective reflective surface, are more accurately considered to be "quasi" or "pseudo" focal regions rather than true focal regions as is readily apparent to one familiar with geometric relationships. Thus in this embodiment, the ultrasonic waves are generated adjacent the respective ends of the several air jets 91 symmetrically disposed adjacent the periphery of impeller 82 which corresponds to one pseudo focal region of the cycloid. The waves thus generated are then reflected by the inner surfaces of the various compartments 75a–78a into their respective second pseudo focal regions which define central focal region 80a.

Thus, as in the embodiments of Figs. 3 and 4, the material to be comminuted is directed through central focal region 80a where it is acted upon by the ultrasonic waves.

Other reflective compartment configurations may readily occur to one familiar with such solid geometrical configurations, the only limitations being that the configuration has at least one focal region (or point) disposed at a finite location to permit the passage of solid matter and ultrasonic waves therethrough and an inner surface capable of reflecting waves into that focal region. It is of course understood that all of the comminution chambers are normally filled with a suitable sound transporting gaseous medium such as air, the inert gases, steam and the like.

In the discussion of impeller slots mention was made of the fact that one slot embodiment, see Figs. 1 and 2, is characterized by having an arcuate back surface which reflects the ultrasonic waves generated into it away therefrom in a path which is generally normal to the original path of generation and substantially parallel to the flow of feed through the chamber thereby simulating wave generation originating at infinity, the locus of the second focal point of the paraboloid.

When of course both focal regions of a given contour have finite loci, as is the case with the described cycloid and ellipsoid of revolution, it is necessary to simulate one of the focal regions. Therefore, as shown in Figs. 3, 4 and 5, reflective compartments having inner surface contours like the ellipsoid and cycloid enable the actual focal regions to be located. Thus, the point of origin of the ultrasonic waves, structurally definable as adjacent the end of air jets, is placed coincident with one of the focal regions as shown, and the waves generated therefrom, regardless of their chosen path, strike the inner surface and are directed thereby in reflection therefrom into the second focal region.

In structure embodying comminution chamber inner surfaces defining solids having two finite focal regions, the specially designed slot of Figs. 1 and 2 can be replaced by a plain radial channel, as shown in Figs. 3, 4 and 5. In the embodiments of Figs. 3, 4 and 5, the generation of ultrasonic waves occurs at an actual focal region of the chamber and therefore there is no need for focal region simulation. The waves thus created in these later embodiments pass in a direction generally normal to that of the feed flow.

It is significant that the contour of the inner surface of chamber be sonically reflective and capable of concentrating all of the waves impinging upon its surface into a common focal region. It is of further significance that the contour of the chamber inner surface defines a configuration having at least two focal regions, of which at least one is at a finite location. It is of still further significance that the generated ultrasonic waves originate at a location corresponding to or simulating one of the focal regions so that any waves generated at and transmitted from that region will be reflected by any portion of the chamber surface into another of the focal regions. Accordingly, all of the waves generated by the action of the air stream upon the impeller will be concentrated into the focal region through which the material to be comminuted is passed.

It has been determined that the efficiency of the apparatus of the present invention may be further enhanced by presizing the feed material before introducing it into the feed inlet. By selecting feed particles of substantially uniform size, the range of the natural frequencies possessed by the several materials is more limited and consequently more accurately approximated by the wave generator. The presizing can be effected by any conventional classifying equipment such for example, as vibrating screens.

In summary, the disclosed apparatus and methods reduce the size of rocks, minerals and the like by utilizing the energy of ultrasonic waves to vibrationally excite material at or near its natural frequency.

To create the ultrasonic waves, a number of air jets are radially disposed about the periphery of a comminution chamber and in line with an interposed impeller rotatable at high speeds. The impeller is provided with shaped discrete radial openings. The interruption of the air jet flows by the impeller walls or partitions (vanes) between the several impeller openings creates the ultrasonic waves. As previously explained, these waves have a frequency equal to impeller speed times the number of openings. The openings are so shaped as to either simulate or reproduce wave origin at a focal region of a comminution chamber. The openings or slots thus reflect and/or direct the waves into contact with the reflective inner contour of the comminution chamber from whence they are again reflected and focused onto the material particles passing through the comminution region which corresponds to the second focal region of the chamber.

The operation of comminution occurs when the various parts of the individual feed particles are vibrated out-of-phase at resonance. Vibration at resonance is effected by driving the impeller at such rotational speed as to generate ultrasonic frequencies at or near those of the natural frequencies of the feed material particles and then focusing those waves onto the particles. As is well known, the natural frequency of a particle is a function of Young's modulus, density and particle size.

To aid in a fuller understanding of the present invention, the following mathematical relationship to determine the natural vibration frequency of a material is presented (see: "Ultrasonics and Their Scientific and Technical Application" by Ludwig Bergman, John Wiley & Sons, Inc., New York, 1938, page 16):

$$N = \frac{1}{2d}\sqrt{\frac{E}{\rho}}$$

where:

$N$ = natural or fundamental frequency of vibration of a particle along its thickness (small $d$), assuming no coupling with vibrations set up in the direction transverse to the thickness (c.p.s.),
$d$ = thickness of particle (inches),
$E$ = modulus of elasticity (lb./in.$^2$),
$\rho$ = mass density of material (lb.-sec.$^2$/in.$^4$).

To convert mass density to weight density, which is the more conventional expression of density, divide mass density by the acceleration of gravity, $g$ (in./sec.$^2$). Weight density thus is expressed in lbs./in.$^3$ and is indicated by $\rho'$ in the following equation:

$$N = \frac{1}{2d}\sqrt{\frac{Eg}{\rho'}}$$

which is the same as Bergman's equation except that it has been adjusted to the English system of measurement from the c.g.s. system employed by Bergman.

The simple relationship not only holds true for a particle in shape of infinitely large plate of thickness ($d$), Bergman (ibid, page 17, first paragraph) shows that it also holds within about 2.2% for particles of limited size.

Figure 9:
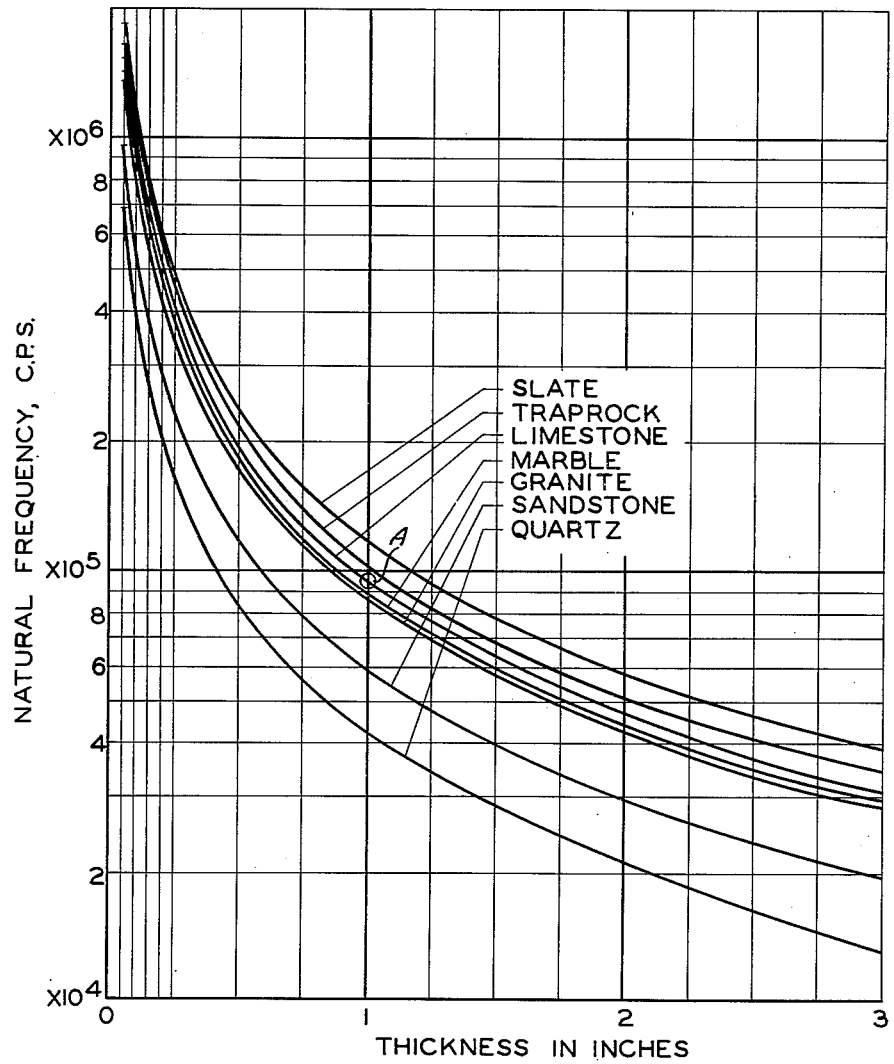
Fig. 9 is a chart comparing the natural frequency (in c.p.s.) of certain exemplary materials usable in the practice of the present invention with its thickness (in inches).

Fig. 9 sets forth the correlation between the natural frequency of certain exemplary materials, namely: slate, traprock, limestone, marble, granite, sandstone and quartz and their thickness in inches. The point on the limestone curve corresponding to the sample calculation presented below for a one inch cube of limestone is circled and labeled "A."

EXAMPLE

Material: limestone,
$d$ = 1 inch,
$E$ = 8.5 × 10$^6$ p.s.i,
$g$ = 32.2 ft./sec.$^2$ = 386.4 in./sec.$^2$; and
$\rho'$ = 155 lb./ft.$^3$ = 0.0897 lb./in.$^3$ Thus:

$$N = \frac{1}{2 \times 1}\sqrt{\frac{8.5 \times 10^6 \times 386.4}{0.0897}}$$

$$N = 95{,}800 \text{ c.p.s.}$$

Following the same procedure, the value of N for the other of the exemplary materials may be calculated from the following data.

*Table I*

[Physical Properties of various minerals [1]]

| Material | $E \times 10^6$ p.s.i.[2] | $\rho'$ (lb./ft.$^3$) | T.S. (p.s.i.) | C.S. (p.s.i.) |
|---|---|---|---|---|
| Limestone | 8.5 | 155 | 580 | 9,500 |
| Sandstone | 3.0 | 143 | 200 | 9,300 |
| Trap Rock | 12.0 | 187 | 800 | 20,000 |
| Slate | 14.0 | 172 | 500 | 14,000 |
| Granite | 7.3 | 165 | 700 | 19,000 |
| Marble | 8.0 | 170 | 500 | 12,700 |
| Quartz | 1.8 | 165 | 240 | 5,300 |

[1] The physical properties of stones and minerals vary widely. The values given in this table are only representative. Additional data are given in the following references: "Johnson's Materials of Construction," M. Withey and J. Aston, eighth edition, J. Wiley and Sons, London, page 258, 1939; "Eshbach's Handbook," second edition, J. Wiley and Sons, pages 13–24, 1952; "Formulas for Stress and Strain," R. J. Roark, third edition, McGraw-Hill, page 373, 1954; "A New Theory of Comminution," Fred C. Bond and Jen-Tung Wang, A.I.M.E. Transactions, vol. 187, No. 8, page 875, August, 1950; "Steel Construction Handbook," fifth edition, American Institute Steel Construction, pages 346 and 350, 1954; and "Elements of Strength of Materials," S. Timoshenko and G. MacCollough, D. Van Nostrand Co., Toronto, page 388, 1949.

[2] The moduli of elasticity in tension and in compression are practically the same (see: "Johnson's Materials of Construction, op. cit., page 258).

*Table II*

[Natural frequencies of various thicknesses of the minerals of Table I (in 1000 c.p.s.)]

| Mineral | Thicknesses, Inches | | | | | |
|---|---|---|---|---|---|---|
| | 1/16 | 1/4 | 1/2 | 1 | 2 | 3 |
| Limestone | 1,533 | 383 | 196 | 95.8 | 47.9 | 31.9 |
| Sandstone | 946 | 237 | 118 | 59.1 | 29.6 | 19.7 |
| Trap Rock | 1,656 | 414 | 207 | 103.5 | 51.8 | 34.5 |
| Slate | 1,869 | 468 | 234 | 116.8 | 58.4 | 38.9 |
| Granite | 1,376 | 344 | 172 | 86.0 | 43.0 | 28.6 |
| Marble | 1,416 | 354 | 177 | 88.5 | 44.3 | 29.5 |
| Quartz | 681 | 170 | 85.0 | 42.6 | 21.3 | 14.2 |

These values are calculated in the manner shown and appear in Fig. 9.

While several embodiments and modifications of the apparatus and methods of the present invention have been thus described, it is understood that they are done so to exemplify, not to limit, the present disclosure. Such other modifications and alterations of the arrangement of structural elements and members and other specific applications of both the method and the means as may readily occur to the skilled artisan are intended to fall within the scope of this invention whose sole limitations are expressed in the appended claims.

What is claimed is:

1. Comminution apparatus comprising in combination: means for generating ultrasonic waves and controlling said waves to have a frequency approximating the natural frequency of a preselected mineral; means for directing said waves into a focal region; and means for directing the preselected mineral into said focal region whereby said solid material is engaged by said ultrasonic waves region whereby said preselected mineral is engaged by said ultrasonic waves and comminuted by vibratory forces induced therein by said waves.

2. A combination comprising: means for generating ultrasonic waves including means for selectively controlling the frequency of said waves to approximate the natural frequency of the solid mineral to be comminuted thereby; means for concentrating said waves into a focal region; and means for directing the solid mineral to be comminuted into said focal region for comminuting engagement therein by the ultrasonic energy of said waves.

3. A combination comprising: first means for generating ultrasonic waves; control means operatively associated with said first means for selectively varying the frequency of the waves generated thereby; focusing means for concentrating said waves into a comminution region; and feed means for passing solid mineral into said region wherein that portion of said solid mineral having a natural frequency approximated by said frequency of said waves is engaged by said waves and comminuted thereby.

4. A combination comprising: first means for generating ultrasonic waves; control means operatively associated with said first means for preselecting the frequency of said waves to approximate the natural frequency of the mineral to be comminuted thereby; focusing means for concentrating said waves into a comminution region; and feed means for passing solid mineral particles into said region for comminuting engagement therein by said waves.

5. A combination comprising: a comminution chamber having an internal surface characterized by the ability to reflect sound waves impinging thereupon into a common focal region irrespective of the portion of said surface impinged upon by said waves; means operatively associated with said chamber for generating ultrasonic waves of a preselected frequency into said chamber for impinging upon said surface and reflection thereby into said focal region; and means operatively associated with said chamber for directing solid matter having a natural frequency substantially equal to said preselected frequency into said focal region for comminuting engagement by said waves.

6. A combination according to claim 5 in which said comminution chamber defines a paraboloid of revolution having its axis of revolution coincident with the axis of flow of said matter through said chamber.

7. A combination according to claim 6 in which said means for generating said ultrasonic waves comprises: a rotatable impeller having a plurality of radially extending discrete slot portions defining a foraminous belt on the outer periphery thereof; and a plurality of air jets symmetrically disposed about the periphery of said impeller in substantial alignment with said belt and coacting therewith to generate said ultrasonic waves into said chamber.

8. A combination according to claim 7 in which each of said slot portions is provided with a sonically reflective back surface for reflecting said ultrasonic waves into a wall of said chamber.

9. A combination according to claim 8 in which each of said sonically reflective back surfaces defines a parabolic segment having the respective air jets positioned at its finite focus whereby the waves generated thereby are reflected by said surface toward its infinite focus.

10. A combination according to claim 5 in which said comminution chamber comprises a plurality of symmetrically disposed reflective compartments each of which defines a cycloid of revolution having its axis of rotation extending radially from said chamber and generally normal to the axis of flow of matter through said chamber.

11. A combination according to claim 10 in which said means for generating said ultrasonic waves comprises a rotatable impeller having a circumferential foraminous belt defined radially therethrough and a plurality of air jets symmetrically disposed about the periphery of said impeller in substantial alignment with said belt.

12. A combination according to claim 10 in which each of said compartments define a cycloid of revolution having an outer and an inner pseudo focal point, said outer focal point being coterminous with said generating means and said inner focal point being within said focal region.

13. A combination according to claim 5 in which said comminution chamber comprises a plurality of symmetrically disposed reflective compartments, each of said compartments defining an ellipsoid of revolution having its outermost focal point disposed coterminous with said generating means and its innermost focal point within said focal region.

14. The method of comminuting solid particles comprising: generating ultrasonic waves at or near the natural frequency of the particles to resonate the particles; focusing said ultrasonic waves into a relatively small concentrated region; and directing said solid particles into said region to engage said particles whereby said solid particles resonate and fracture in response to said waves.

15. The method of comminuting solid particles of matter by ultrasonic energy comprising: generating a concentration of ultrasonic waves approximating the natural frequency of the matter to be comminuted into a relatively small focal region, introducing said solid particles of matter into said focal region for comminuting engagement with said waves, and discharging comminuted particles of matter from said region.

16. The method of comminuting mineral particles, such as limestone and the like, comprising passing mineral particles through a region of concentrated ultrasonic waves having frequencies at or near the natural frequency of said mineral particles for engagement by said waves whereby said particles resonate and fracture in response to said engagement by said waves.

17. A combination comprising a comminution chamber having a sonically reflective inner surface of the character whereby sonic waves generated at one focal point thereof are reflected to the other focal point thereof irrespective of the direction of departure of said waves follow from said one focal point, means operatively associated with said chamber for generating ultrasonic waves from a point of origin coinciding with said one focal point, additional means for preselecting the frequency of said waves, and feed means for directing a flow of solid material through said other focal point where, upon contact with said waves having a preselected frequency approximately the natural frequency of said material, said material is comminuted by body forces induced therein.

18. A combination comprising a comminution chamber characterized by at least two focal regions, at least one of which is disposed at a finite locus within said chamber; means for generating ultrasonic waves in manner to simulate the origin of said waves at another of said focal regions, said waves being sonically reflected by said chamber into said one of said focal regions; additional means for preselecting the frequency of said waves; and feed means for directing solid material through said one of said focal regions where, upon contact with waves having a preselected frequency approximating the natural frequency of said material, said material is comminuted by vibratory forces induced therein by said waves.

References Cited in the file of this patent

UNITED STATES PATENTS

| | | |
|---|---|---|
| 1,734,975 | Loomis | Nov. 12, 1929 |
| 1,738,565 | Claypoole | Dec. 10, 1929 |
| 2,225,797 | Plauson | Dec. 24, 1940 |
| 2,524,573 | Robinson | Oct. 3, 1950 |
| 2,535,680 | Horsley et al. | Dec. 26, 1950 |
| 2,617,874 | Lewis | Nov. 11, 1952 |
| 2,709,552 | Lecher | May 31, 1955 |
| 2,715,383 | Meng | Aug. 16, 1955 |
| 2,725,219 | Firth | Nov. 29, 1955 |
| 2,738,172 | Spiess et al. | Mar. 13, 1956 |
| 2,889,580 | Wald | June 9, 1959 |

OTHER REFERENCES

Notes on the Dispersion of Solids in Liquid by Ultrasonic Waves, by Karl Sollner. Transactions of Faraday Society 34, pages 1170–1174 (1938).

Ultrasonic Engineering by Alan E. Crawford, published by Academic Press, Incorporated, New York, 1955, pages 133–134, 182–184.